United States Patent
Verhage et al.

(10) Patent No.: US 12,137,691 B2
(45) Date of Patent: Nov. 12, 2024

(54) METHOD FOR TREATING PLANT SEED

(71) Applicant: RIJK ZWAAN ZAADTEELT EN ZAADHANDEL B.V., De Lier (NL)

(72) Inventors: Adriaan Verhage, De Lier (NL); Gerardus Johannes Maria Bijl, De Lier (NL); Frans Verheij, De Lier (NL)

(73) Assignee: RIJK ZWAAN ZAADTEELT EN ZAADHANDEL B.V., De Lier (NL)

( * ) Notice: Subject to any disclaimer, the term of this patent is extended or adjusted under 35 U.S.C. 154(b) by 0 days.

(21) Appl. No.: 16/923,216

(22) Filed: Jul. 8, 2020

(65) Prior Publication Data

US 2021/0015102 A1 Jan. 21, 2021

Related U.S. Application Data

(63) Continuation-in-part of application No. PCT/EP2019/050545, filed on Jan. 10, 2019.

(30) Foreign Application Priority Data

Jan. 10, 2018 (NL) .................................. 2020261

(51) Int. Cl.
*A01N 59/16* (2006.01)
*A01N 43/08* (2006.01)

(52) U.S. Cl.
CPC ............. *A01N 59/16* (2013.01); *A01N 43/08* (2013.01)

(58) Field of Classification Search
CPC .................................. A01N 59/16; A01C 1/06
See application file for complete search history.

(56) References Cited

U.S. PATENT DOCUMENTS

2010/0130365 A1* 5/2010 Notten ................... A01C 1/00
504/138

FOREIGN PATENT DOCUMENTS

| CA | 3049799 A1 | 8/2018 |
|---|---|---|
| CN | 1915028 A | 2/2007 |
| CN | 104016815 A * | 9/2014 |
| CN | 105494447 A | 4/2016 |
| CN | 106 508 974 A | 3/2017 |
| CN | 106 922 731 A | 7/2017 |
| CN | 110810421 A * | 2/2020 |
| EP | 3205209 A1 | 8/2017 |
| GB | 2 110 51 8 A | 4/1982 |
| JP | H011-149704 A | 6/1989 |
| JP | 2004-217611 A | 8/2004 |
| WO | 00/08933 | 2/2000 |

OTHER PUBLICATIONS

Wisconsin Horticulture: Hot-Water Seed Treatment for Disease Management, 2017, 4 page, https://hort.extension.wisc.edu/articles/hot-water-seed-treatment-for-disease-management/.*
El-Sayed et al., Egypt J. Phytopathol., 2017, 45:1, 135-156.*
Ellis et al., Seed Science Research, 1, 1991, 275-279.*
OSC seeds: peanut seeds, 2024, 3 pgs (https://www.oscseeds.com/product/valencia-peanut-seeds-1885/#:~:text=Typically%20a%20Valencia%20peanut%20seed,curing%20conditions%20between%20crop%20lots,).*
Shahda et al., Egypt J Phytophatol., 2011, 39/1, 225-235.*
Database CA [Online] Chemical Abstracts Service, Columbus, Ohio, US: Abstract: Database Accession No. 167:218317: Fuchang Dong, et al., Fungicide for preventing and treating paddy seedbed damping-off, Aug. 17, 2017.
Database CA [Online] Chemical Abstracts Service, Columbus, Ohio, US: Abstract: CA Caesar Accession No. 1264:166:391488 CA: Yongshen Sun, Composite formulation for controlling damping off and its preparation method, Apr. 27, 2017.
Database CA [Online] Chemical Abstracts Service, Columbus, Ohio, US: Abstract: CA Caesar Accession No. 1744: 112:114188 CA: Hidao Shimoda, Coating materials for rice seeds for the enhancement of budding, Mar. 31, 1990.
International Search Report issued Feb. 26, 2019 in PCT/EP2019/050545.
Written Opinion Issued Dec. 18, 2019 in PCT/EP2019/050545.
WPI / 2017 Clarivate Analytics: Accession No. 2016-27296P; L. Chen, et al., Biological Seed Coating Agent Useful Control Soy Root Disease Comprise Copper Sulphate Boric Acid Manganese Iron Potassium Phosphate (Dec. 23, 2015).
Nashwa M. A. Sallam, et al, Efficacy of antioxidants on incidence of Fusarium root and pod rot diseases in peanut, Archives of Phytopathology and Plant Protection (2017) https://doi.org/10.1080/03235408.2017.1317465.
Lei Yu, Population Genetic Diversity of Wheat Powdery Mildew in Southwestern Sichuan and the Effect of Intercropping on Epidemic of Wheat Powdery Mildew, Chinese Master Thesis Full-Text Database ,Agriculture Science and Technology, Mar. 2014, p. 11.

* cited by examiner

*Primary Examiner* — Kyle A Purdy
(74) *Attorney, Agent, or Firm* — Duane Morris LLP; Thomas J. Kowalski (57) ABSTRACT

The present invention relates to a method for treating plant seed in order to protect the growing seedling or plant against damping-off, coated plant seed, and the use of iron salt for coating plant seed to protect the growing seedling or plant against damping-off.

8 Claims, 11 Drawing Sheets

METHOD FOR TREATING PLANT SEED

RELATED APPLICATIONS AND INCORPORATION BY REFERENCE

This application is a continuation-in-part application of international patent application Serial No. PCT/EP2019/050545 filed 10 Jan. 2019, which published as PCT Publication No. WO 2019/137998 on 18 Jul. 2019, which claims benefit of NL patent application Serial No. 2020261 filed 10 Jan. 2018.

The foregoing applications, and all documents cited therein or during their prosecution ("appin cited documents") and all documents cited or referenced in the appin cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention relates to a method for treating plant seed in order to protect the growing seedling or plant against damping-off, coated plant seed, and the use of iron salt for coating plant seed to protect the growing seedling or plant against damping-off.

BACKGROUND OF THE INVENTION

The commercial production of plant seed, and in particular vegetable plant seed, often involves treatment of the seed with hot water. A treatment of plant seed with hot water can be used to disinfect the seed. A major disadvantage of this treatment is that most microorganisms in and on the seed are killed, also the microorganisms that would protect the seed against damping-off.

Damping-off (or root rot) is a horticultural disease or condition, caused by several different pathogens that kill or weaken seeds or seedlings before or after they germinate. It is most prevalent in wet and cool conditions. There are various symptoms associated with damping-off, like lack of germination, root rot, and wilting. In the end, these symptoms result in the death of at least some seed and/or seedlings in any given population. A number of different fungi and fungi-like organisms cause the symptoms of damping off, including *Alternaria* species; *Botrytis*; *Fusarium* species; *Macrophomina phaseoli*; *Phyllosticta* species; *Phytophthora*; *Pseudomonas* species; *Pythium*; *Rhizoctonia solani*; *Sclerotium rolfsii*; and Thielaviopsi. The most common pathogen causing damping-off in vegetable plants like spinach is the oomycete *Pythium*. Usually, seeds will germinate and develop into seedlings as normal. However, the infected seeds and or seedlings rot even before the seedlings emerge above the ground or a short time after emergence. After emergence, the infected seedlings suddenly collapse and die within a few days. Damping-off severely reduces the number of plants that can be grown into commercially acceptable plants for consumption or plants useful in breeding. There is therefore a great need for methods that prevent damping-off from occurring.

The use of fungicides to control fungal or fungi-like pathogens that cause damping-off is undesired or prohibited in many breeding or growing locations. It is therefore very important to prevent the introduction of these fungi or fungi-like pathogens. This is not always feasible. Breeders and growers are therefore continuously looking for other solutions to prevent damping-off, whether seeds are treated with hot water or not.

Citation or identification of any document in this application is not an admission that such document is available as prior art to the present invention.

SUMMARY OF THE INVENTION

The present inventors have found that when seeds, irrespective whether they are first subjected to a hot water treatment or not, are coated with an iron salt they germinate into healthy seedlings and grow into healthy plants, especially when grown under damping off conditions.

The present invention thus relates to a method for treating plant seed, comprising contacting plant seed with a solution comprising an iron salt. The present invention in particular relates to a method for preventing damping-off from occurring on plant seed and/or seedlings, the method comprising treating the plant seed with a solution comprising an iron salt.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings.

DETAILED DESCRIPTION OF THE INVENTION

A seedling is defined herein as the developmental stage from a seed from which the root tip has just emerged after germination up until the development of the vegetative plant before the formation of the first flower of flower cluster.

Iron(II)bromide, iron(II)chloride, iron(II)sulfate, iron(II) ammonium sulfate, iron(III)bromide, iron(III)chloride, iron (III)sulfate, iron(III)ammonium sulfate and ascorbate show good effects in reducing fungal growth on the plant seedlings and plants. The iron salt is thus preferably selected from the group consisting of iron(II)bromide, iron(II)chloride, iron (II)sulfate, iron(II)ammonium sulfate, iron(III)bromide, iron (III)chloride, iron(III)sulfate, iron(III)ammonium sulfate and ascorbate. The most preferred iron salt is $Fe(II)SO_4$ or $Fe(III)SO_4$ Optionally, a combination of two or more iron salts can be used in the method of the invention.

The solution further comprises a solvent such as water, or any other solvent or combination of solvents in which the iron salt can be dissolved.

The solution comprises at least 50 μg, and preferably at least 100 μg, 150 μg, 200 μg, 250 μg, or 500 μg iron salt per seed to be treated, which is dissolved in a suitable amount of solvent. The suitable amount of solvent depends at the lower end on the solubility of the iron salt and at the upper end on the amount of solvent that can be absorbed by the seed.

The method may further comprise a step of contacting the plant seed with vitamin C. The combination of treating the plant seed with iron salt and vitamin C may provide a stronger, or even synergistic, anti-damping-off effect.

The plant seed may be contacted with at least 25 µg, and preferably at least 50 µg, 75 µg, 100 µg, 125 µg, 150 µg, or 175 µg vitamin C per seed to be treated, which is dissolved in a suitable amount of a suitable solvent. The suitable amount of solvent is determined at the lower end on the solubility of vitamin C and at the upper end on the amount of solvent that can be absorbed by the seed. Vitamin C may be part of the solution comprising the iron salt.

The ratio between the amount of iron salt and the amount of vitamin C contacted to a seed can be varied from 0.05 to 50. In one embodiment, this ratio is set at 1.1. This ratio is indicated in molar equivalents (Meq.), as used herein.

By contacting the plant seed with the solution comprising iron salt, and optionally vitamin C, the plant seed is coated with iron salt and optionally vitamin C. The iron salt in the coating protects the plant seed against damping-off. Vitamin C is believed to enhance this effect by stabilizing the iron ion, improving the iron uptake by the plant, improving the seed quality by lowering the pH, and/or by exerting anti-oxidant activity.

The solution comprising iron salt, and optionally vitamin C, can be applied to the plant seed in any suitable manner to provide a coating. For instance, the solution can be applied via a spinning disk to the plant seed, which may be present on a rotary coater.

The coated seeds may subsequently be dried. This can be performed in any suitable manner, such as for instance drying at 25° C. at 35 RH until the amount of moisture in the seed is equal to the amount of moisture in the seed before the coating treatment. The amount of moisture is also indicated with the term moisture content (MC) indicated as a percentage of the total weight of a seed.

In one embodiment, the moisture content of a coated seed after a drying treatment is, in increasing order of preference, lower than 30%, lower than 25%, lower than 20%, lower than 15%, lower than 14%, lower than 13%, lower than 12%, lower than 11%, lower than 10%, lower than 9%, lower than 8%, lower than 7%, lower than 6%, or lower than 5%.

Seed that would greatly benefit from the treatment method are seeds that undergo hot water treatment and are prone to damping-off. Such seed include, but are not limited to, seeds from plants belonging to the following genera: *Spinacia, Lactuca, Solanum, Daucus, Cucumis, Cucurbita, Eruca, Brassica, Raphanus, Apium, Cichorium, Phaseolus, Beta, Valerianella, Diplotaxis, Allium, Asparagus, Foeniculum, Citrullus* and *Fragraria*. The treatment will also be beneficial for seed with a suboptimal microbial composition. Such seed are usually prone to damping-off without having been subjected to hot water treatment.

The present invention also relates to plant seed coated with iron salt and optionally vitamin C. Such plant seed coating protects the seed and/or the seedling growing therefrom against damping-off.

Protection against damping-off is herein defined as that the coated seed produces a plant that is healthy at least 13 days after sowing in the presence of a microbial pathogen, such as an oomycete, in particular *Pythium*. In the case of a batch of seed, protection against damping-off is herein defined as a significant increase in the number of healthy plants at least 13 days after sowing in the presence of a microbial pathogen, such as an oomycete, in particular *Pythium*, when compared to the number of healthy plants grown from seeds without a coating comprising iron salt and optionally vitamin C. The optimal conditions for determining protection against damping-off for each crop or variety can routinely be determined by a person skilled in the art.

A healthy plant is herein defined as a plant that does not show any symptoms of damping-off above the ground. Preferably, a healthy plant does also not show any symptoms of damping-off in its root system. Symptoms of damping-off and root rot can be one or more of the following: poor seed germination, pre-emergence death of seedlings, post-emergence death of newly emerged seedlings, stunted plants, yellowed lower leaves, general poor growth, wilting, and eventual collapse and death of older plants; roots of infected plants can appear water-soaked or brown to black in color; the upper taproot may be girdled by a necrotic lesion, or the tip of the taproot can be necrotic; and in severe cases, nearly all roots may be girdled or rotted off.

The plant seed may be any plant seed but is preferably selected from the group consisting of seeds from plants belonging to the following genera: *Spinacia, Lactuca, Solanum, Daucus, Cucumis, Cucurbita, Eruca, Brassica, Raphanus, Apium, Cichorium, Phaseolus, Beta, Valerianella, Diplotaxis, Allium, Asparagus, Foeniculum, Citrullus* and *Fragraria*.

The present invention further relates to the use of iron salt, and optionally vitamin C, for treating plant seed, and in particular for protecting seed and/or seedlings against damping-off. The plant seed to be treated may be any plant seed but is preferably selected from the group consisting of seeds from plants belonging to the following genera: *Spinacia, Lactuca, Solanum, Daucus, Cucumis, Cucurbita, Eruca, Brassica, Raphanus, Apium, Cichorium, Phaseolus, Beta, Valerianella, Diplotaxis, Allium, Asparagus, Foeniculum, Citrullus* and *Fragraria*.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

EXAMPLES

Example 1: Preparation of Iron Salt Solution

A solution of an iron salt, such as for instance $Fe(II)SO_4$, and vitamin C in water is prepared by stirring of the chemicals until a clear, colorless solution is obtained.

A rotary coater is charged with seeds and the iron salt with vitamin C solution is added to the seeds via a spinning disk.

The seeds are dried after coating at 25° C./35 RH until the moisture in the seed is equal to the moisture of the seed before treatment with the iron salt solution.

Example 2: The Effect of the Iron Salt Solution with Vitamin C on the Germination of Spinach Seed Exposed to *Pythium irregulare*, and Survival of Seedlings Grown Therefrom The effect of the iron salt solution prepared in Example 1 on both germination and survival against *Pythium* is investigated on hot water treated spinach seeds of the variety Mandril. A suitable protocol for the hot water treatment is described in Extension Factsheet Ohio State University; Sally A. Miller and Melanie L Lewis Ivey; "Hot Water Treatment of Vegetable Seeds to Eradicate Bacterial Plant Pathogens in Organic Production Systems".

The hot water treated spinach seeds were coated with an $Fe(II)SO_4$ coating supplemented with vitamin C. Two different concentrations of $Fe(II)SO_4$ and vitamin C in the coating solution were used: 1 μg $Fe(II)SO_4$ per seed and 1.1 molar equivalents (Meq.) vitamin C, and 250 μg $Fe(II)SO_4$ per seed and 1.1 Meq. vitamin C. As a control, hot water treated seeds without coating and untreated seeds were used.

Seeds were sown in trays. Germination of the seeds was assessed in trays without any inoculum. The effect of the coating on the survival of seedlings was assessed in trays inoculated with *Pythium irregulare* isolate 779-2010.

Trays without the inoculum were prepared by mixing+/− 10 L of sowing soil with 1 L of tap water in white trays. In total, 117 sowing holes were made in the trays with a press. To prevent any interaction between treatments, only 1 treatment per tray was sown. For each treatment, 3 replicates of 117 seeds were sown. The seeds were topped with two cups (diameter 12 cm) of sowing soil containing 5 grams of inoculum media. Trays were placed in a controlled climate cell at 20° C., LID->14/10 and a RH of 60%. The number of germinated seeds was counted at 7 days, and the amount of surviving seedlings was counted 7 and 14 days after sowing and inoculation. Trays were physically separated from trays containing *Pythium* inoculum, to prevent cross-contamination.

The inoculum was prepared by growing *Pythium irregulare* on fresh V8 plates for 3 days at 28° C. After incubation, the spores and mycelium were harvested by adding 20 ml of sterile PBS to the plate and scraping it with a sterile spatula. This inoculum was added to the sowing soil.

Trays with inoculum were prepared by mixing+/−10 L of sowing soil with 1 L of tap water in white trays. In total, 117 sowing holes were made in the trays with a press. To prevent any interaction between treatments, only 1 treatment per tray was sown. For each treatment 3, replicates of 117 seeds were sown. The seeds were topped with two cups (diameter 12 cm) of sowing soil containing 5 grams of inoculum (mixed thoroughly in a bucket before topping off). Trays were placed in a controlled climate cell at 20° C., LID->14/10 and a RH of 60%. The number of germinated seeds was counted at 7 days, and the amount of surviving seedlings was counted 7 and 14 days after sowing and inoculation.

Figure 1:
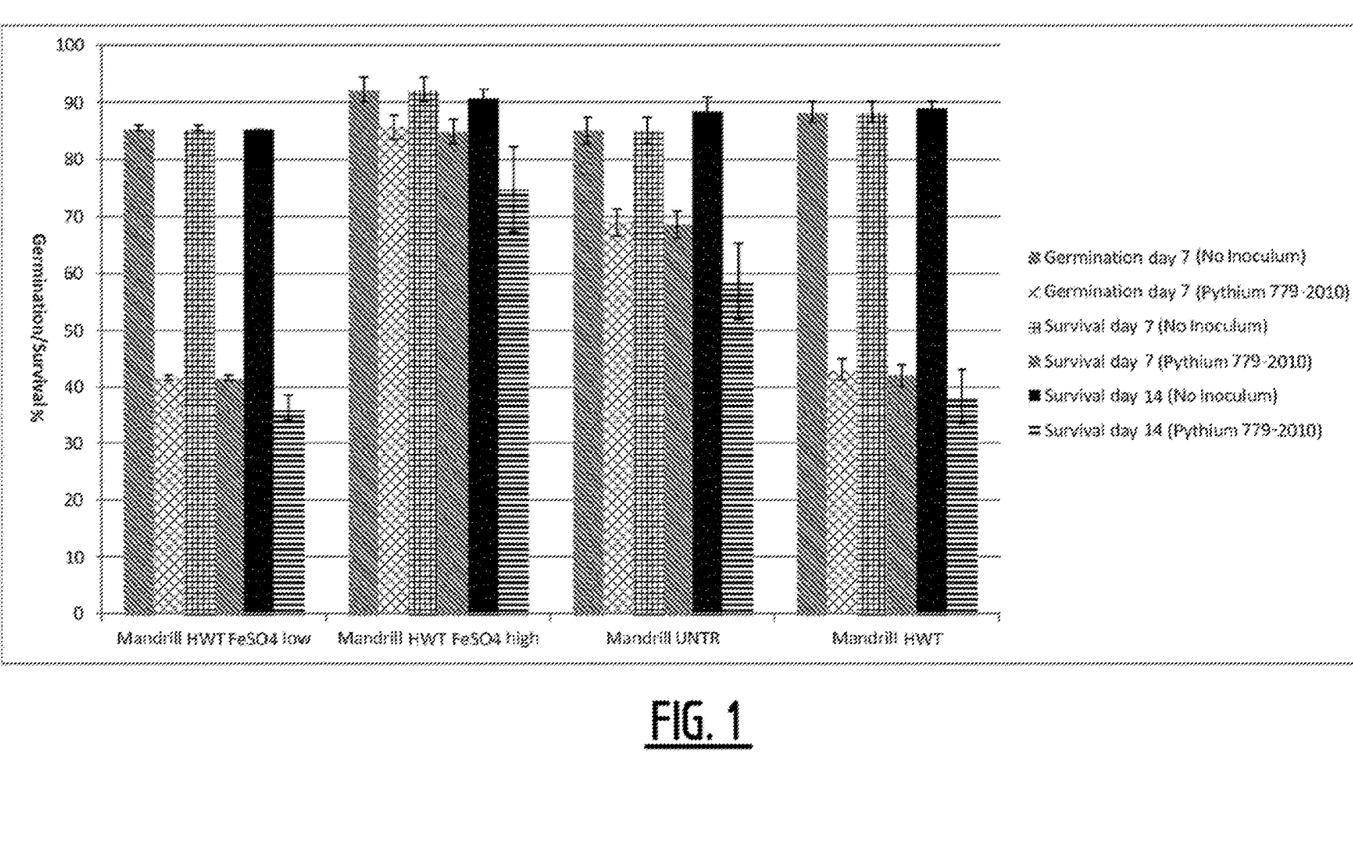
FIG. 1 is a graph showing the effect of hot water treatment of seeds of the variety Mandril and subsequent treatment with low (1 μg/seed) and high (250 μg/seed) concentrations of Fe(II)SO4 in combination with vitamin C. The effect is expressed in the percentage of seedlings that have germinated as determined 7 days after sowing, the percentage of seedlings that are still alive and healthy 7 days after sowing, and the percentage of plants that are still alive and healthy 14 days after sowing. The effect of seeds sown in soil inoculated with *Pythium* is compared with the effect of non-inoculated soil.

The results are shown in FIG. 1. These results indicate that seeds coated with 250 μg $Fe(II)SO_4$ per seed and 1.1 Meq. vitamin C lead to a higher number of germinated seeds and healthy plants than untreated seeds and uncoated seeds. This nicely shows that the combination coating is effective against damping-off.

Example 3: The Effect of Different Concentrations of Iron Salt and the Effect of Vitamin C on the Germination of Spinach Seed Exposed to *Pythium irregulare*, and Survival of Seedlings Grown Therefrom The experiment of Example 2 was repeated with the following modifications:

the spinach seed used are of the varieties Platypus and Meerkat the concentrations of $Fe(II)SO_4$ and vitamin C in the coating solution are: 250 μg $Fe(II)SO_4$ per seed and 1.1 Meq. vitamin C, and 500 μg/$Fe(II)SO_4$ per seed and 1.1 Meq. vitamin C; and additional treatment groups: 1) 250 μg/$Fe(II)SO_4$ per seed; 2) 500 μg $Fe(II)SO_4$ per seed; 3) 175 μg vitamin C per seed; and 4) 350 μg/vitamin C per seed.

Figure 2A:
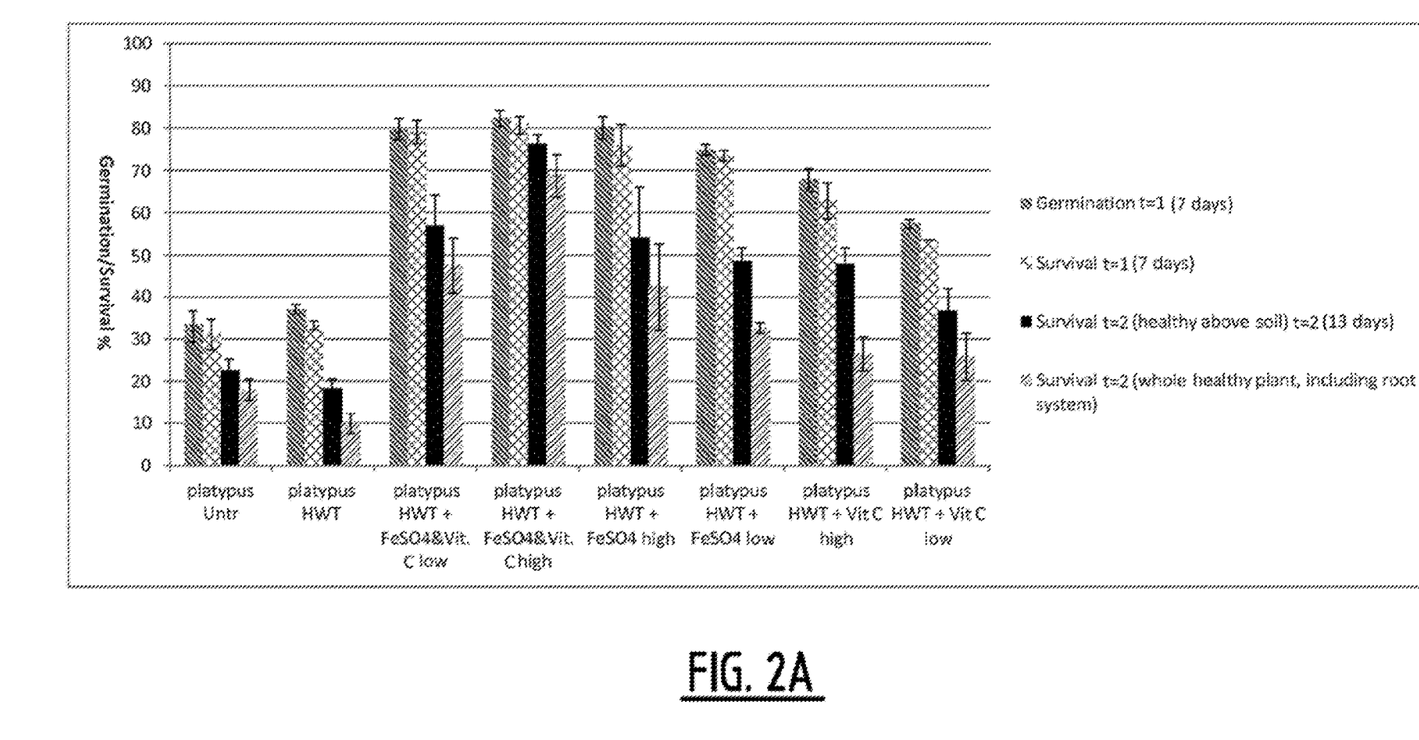
FIG. 2A is a graph showing the effect of hot water treatment of seeds of the variety Platypus and subsequent treatment with low (250 μg/seed) and high (500 μg/seed) concentrations of Fe(II)SO4, with and without vitamin C. The effect is expressed in the percentage of seedlings that have germinated as determined 7 days after sowing, the percentage of seedlings that are still alive and healthy 7 days after sowing, the percentage of plants that are still alive and healthy 13 days after sowing, as determined by visual inspection of the plant above the soil, and the percentage of plants that are still alive and healthy 13 days after sowing, as determined by visual inspection of the plant above the soil as well as of its root system.
Figure 2B:
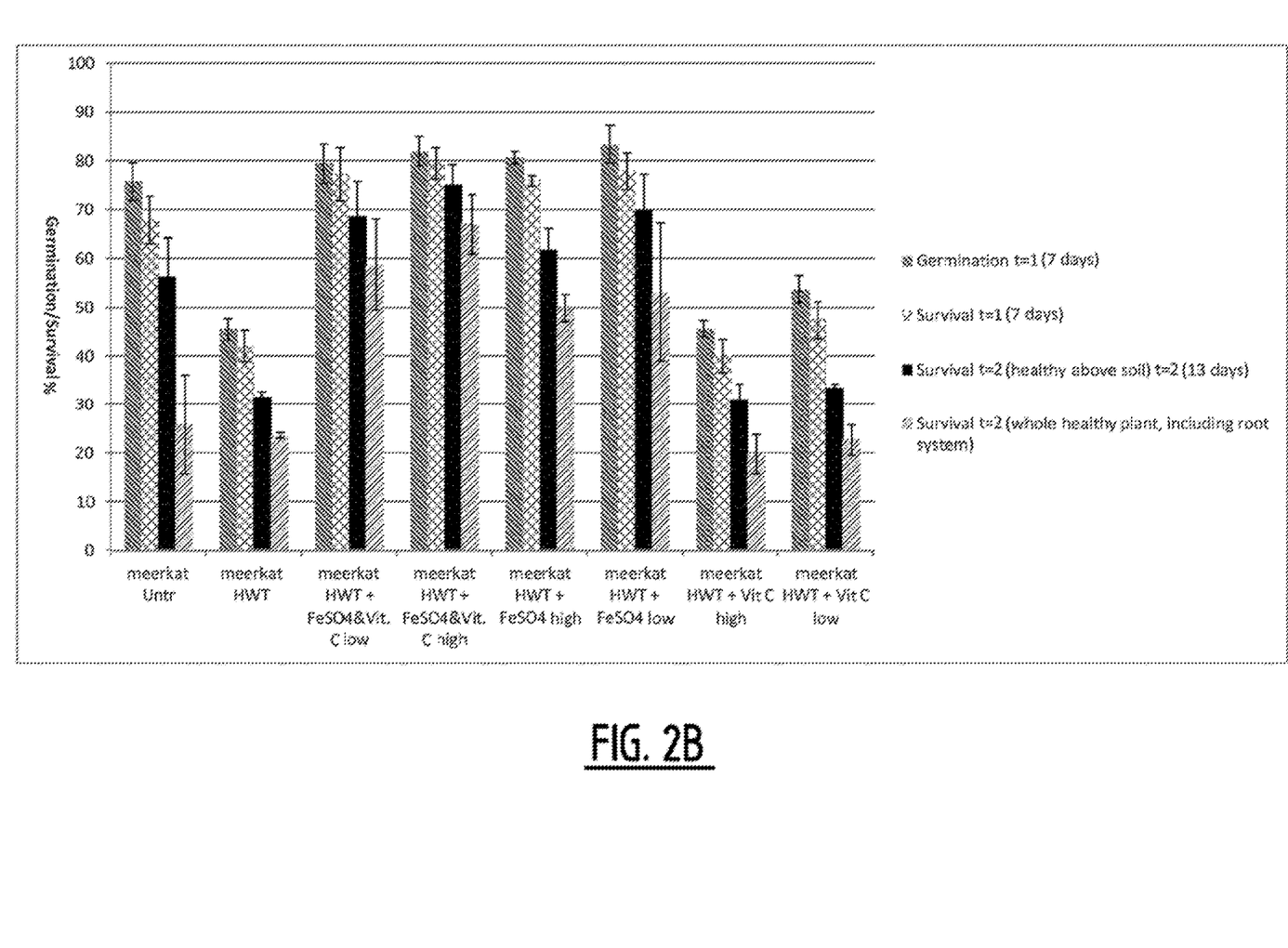
FIG. 2B is a graph showing the effect of hot water treatment of seeds of the variety Meerkat and subsequent treatment with low (250 μg/seed) and high (500 μg/seed) concentrations of Fe(II)SO4, with and without vitamin C. The effect is expressed in the percentage of seedlings that have germinated as determined 7 days after sowing, the percentage of seedlings that are still alive and healthy 7 days after sowing, the percentage of plants that are still alive and healthy 13 days after sowing, as determined by visual inspection of the plant above the soil, and the percentage of plants that are still alive and healthy 13 days after sowing, as determined by visual inspection of the plant above the soil as well as of its root system.

The results are shown in FIGS. 2A and 2B. These results indicate that a coating with only vitamin C does have some effect on the health of the growing plants of variety Platypus (FIG. 2A). This effect is, however, not observed for the variety Meerkat (FIG. 2B). Coating the seeds of both varieties with only iron salt does have a positive effect on the health of the plants. The best effect is observed with the combination of iron salt and vitamin C, and especially with the higher concentration.

Example 4: The Effect of the Iron Salt Solution with Vitamin C on the Germination of Spinach Seed Exposed to *Pythium ultimum*, and Survival of Seedlings Grown Therefrom The experiment of Example 2 was repeated with the following modifications:

in addition to spinach seed of the variety Mandril, also seed of the varieties Finwhale and Woodpecker are used;

the concentrations of $Fe(II)SO_4$ and vitamin C in the coating solution are: 250 μg $Fe(II)SO_4$ per seed and 1.1 Meq. vitamin C, and 500 μg/$Fe(II)SO_4$ per seed and 1.1 Meq. vitamin C; and a different Pythium isolate is used.

Figure 3:
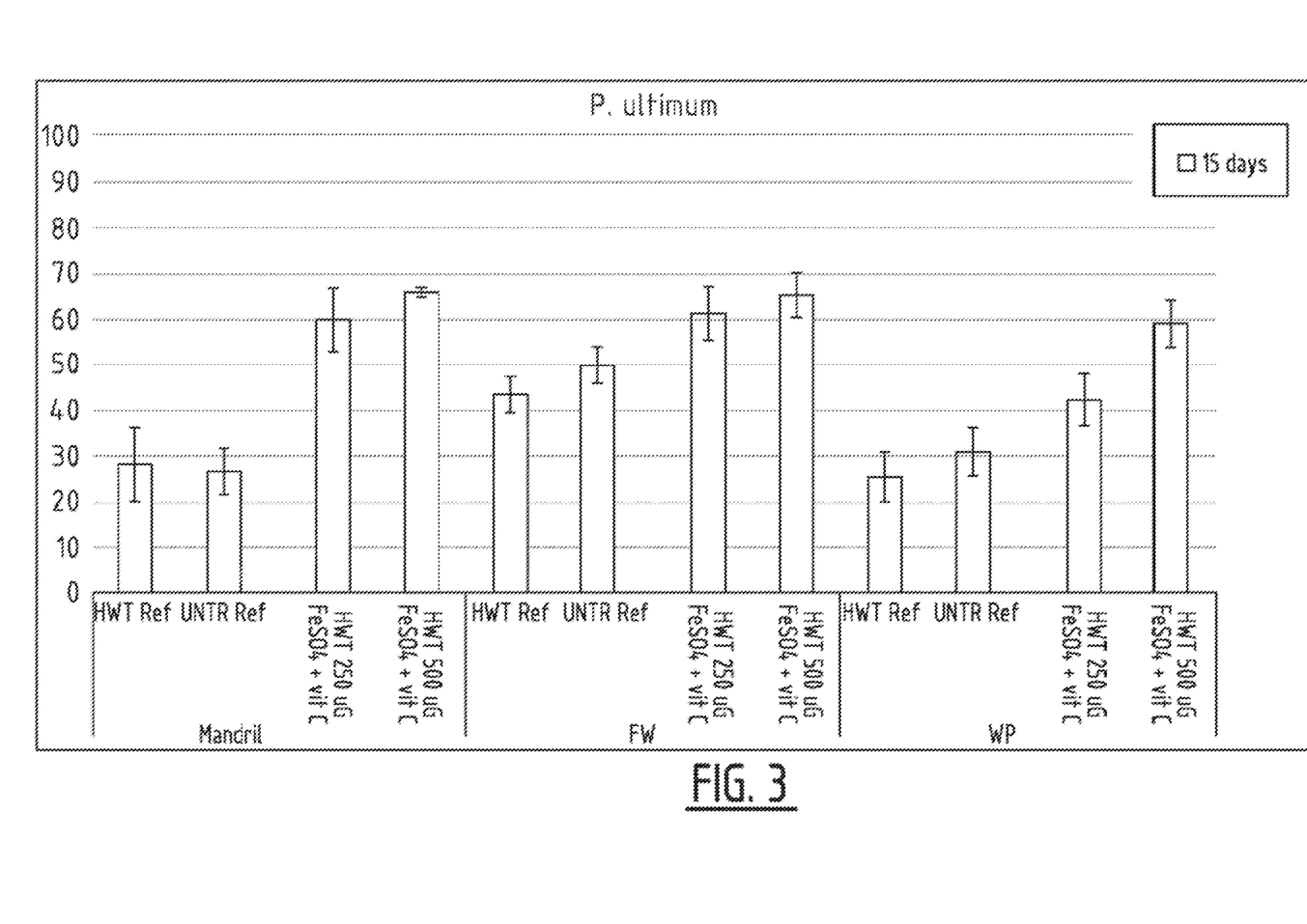
FIG. 3 is a graph showing the effect of hot water treatment of seeds of the varieties Mandril, Finwhale (FW) and Woodpecker (WP), and subsequent treatment with low (250 μg/seed) and high (500 μg/seed) concentrations of Fe(II)SO4, with vitamin C. The effect is expressed in the percentage of seedlings that are still alive and healthy 15 days after sowing in soil infected with *Phytium ultimum*. Bars are means of 3 replicates ±SEM.

The results are shown in FIG. 3. These results indicate that the coating with $Fe(II)SO_4$ and vitamin C is also effective against other Pythium species, in this case *P. ultimum*.

Example 5: The Effect of the Iron Salt Solution with Vitamin C on the Inhibition of In Vitro Growth of *Rhizoctonia* and *Fusarium*

PDA agar plates were prepared in which spinach seeds of the variety Platypus coated with 250 μg $Fe(II)SO_4$ per seed and 1.1 Meq. vitamin C, 500 μg $Fe(II)SO_4$ per seed and 1.1 Meq. vitamin C, or 500 μg $Fe(II)SO_4$ per seed, were imbedded and inoculated with *Rhizoctonia* isolate AU 14/243 or *Fusarium oxysporum* isolate MAFF103063. Clear inhibition of *Rhizoctonia* and *Fusarium* growth was observed for the seed treated with 500 μg $Fe(II)SO4$ and vitamin C. Inhibition was also observed for 250 μg $Fe(II)SO_4$ and vitamin C, and 500 μg $Fe(II)SO4$, but this was weaker when compared to 500 μg $Fe(II)SO_4$ and vitamin C, and 4 days post inoculation the isolate covered the whole plate.

Figure 4A:
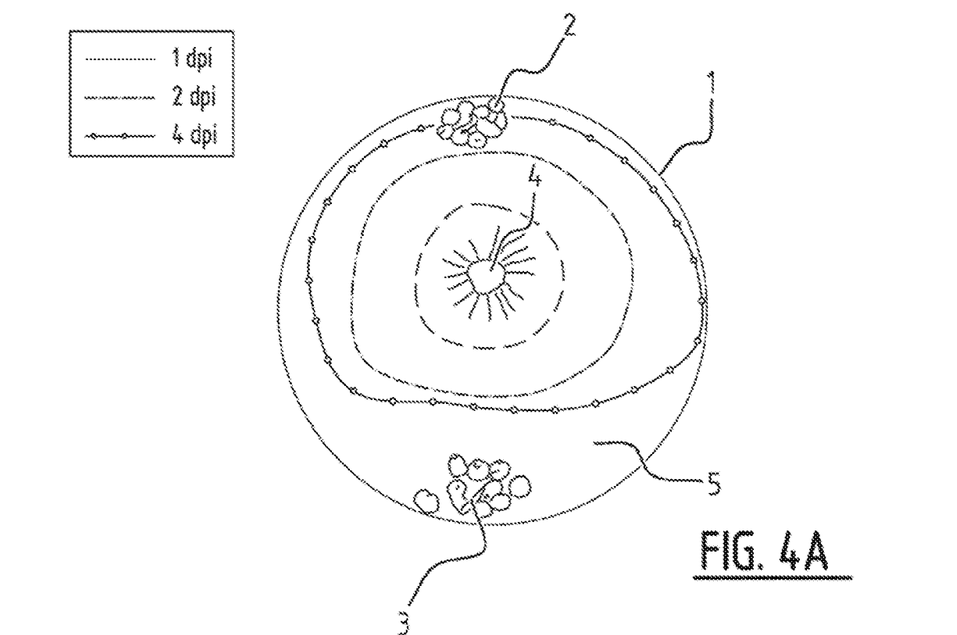
FIG. 4A is a schematic picture of an with *Rhizoctonia*-infected agar plate (1) comprising untreated seeds (2) and seeds coated with 500 μg/seed Fe(II)SO4 (3). Plates were inoculated with *Rhizoctonia* in the center of the plates (4). The growth of *Rhizoctonia* was measured after 1 day, 2 days, and 4 days post-inoculation (dpi). A zone of inhibition (5) is still visible around the coated seeds after 4 dpi.
Figure 4B:
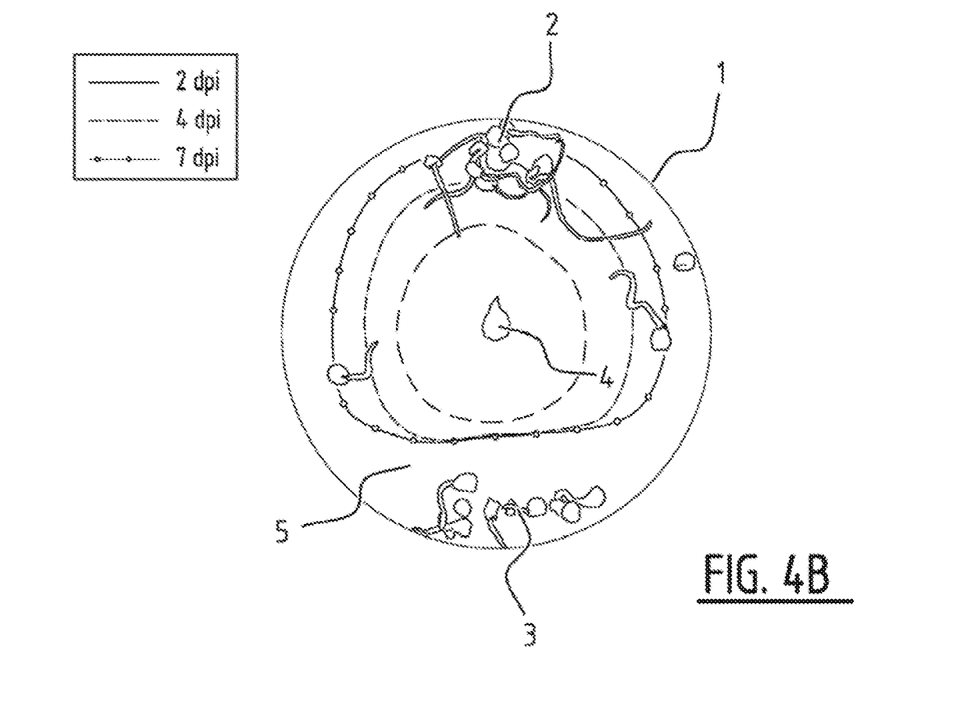
FIG. 4B is a schematic picture of an with *Fusarium*-infected agar plate (1) comprising untreated seeds (2) and seeds coated with 500 μg/seed Fe(II)SO4 (3). The growth of *Fusarium* was measured after 2 days, 4 days, and 7 days post-inoculation (dpi). A zone of inhibition (5) is still visible around the coated seeds after 7 dpi.

The results are shown in FIGS. 4A and 4B. After 4 days (*Rhizoctonia*) and 7 days (*Fusarium*), a zone of inhibition is still visible around the coated seeds but not around the untreated seeds. These results show that the coating with Fe(II)SO$_4$ and vitamin C is also effective against pathogens other than *Pythium*.

Example 6: The Effect of the Iron Salt Solution with Vitamin C on the Germination of Seed Exposed to Isolates that Cause Damping-Off in Carrot and Cucumber, and Survival of Seedlings Grown Therefrom The experiment of Example 2 was repeated with the following modifications:

instead of spinach seed of the variety Mandril, seed of the varieties Finwhale and Woodpecker are used;

the concentration of Fe(II)SO$_4$ and vitamin C in the coating solution is: 500 μg/Fe(II)SO$_4$ per seed and 1.1 Meq. vitamin C; and carrot isolate *Pythium irregulare* (PPO-03) and cucumber isolate *Pythium splendens* (16CU342) are used.

Figure 5A:
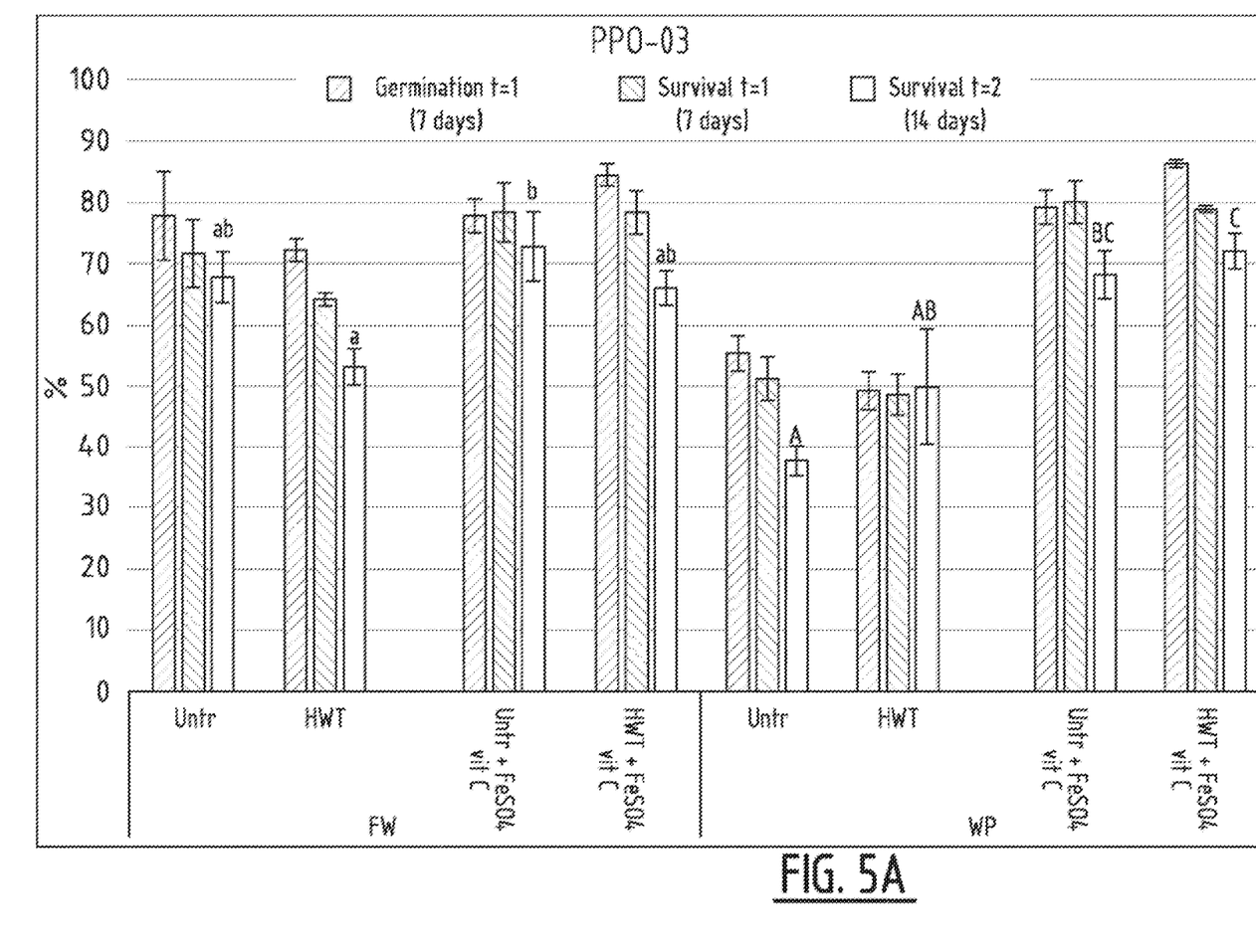
FIG. 5A is a graph showing the effect of hot water treatment of seeds of the varieties Finwhale (FW) and Woodpecker (WP), and subsequent treatment with 500 μg/seed of Fe(II)SO4, with vitamin C. The effect is expressed in the percentage of seedlings that have germinated as determined 7 days after sowing, the percentage of seedlings that are still alive and healthy 7 days after sowing, the percentage of plants that are still alive and healthy 14 days after sowing, in soil infected with *Phytium irregulare* PPO-03. Bars are means of 3 replicates ±SEM. Different letters indicate significant differences according to Tukey's post-hoc test (P<0.05), performed separately for each seed variety at 14 days.
Figure 5B:
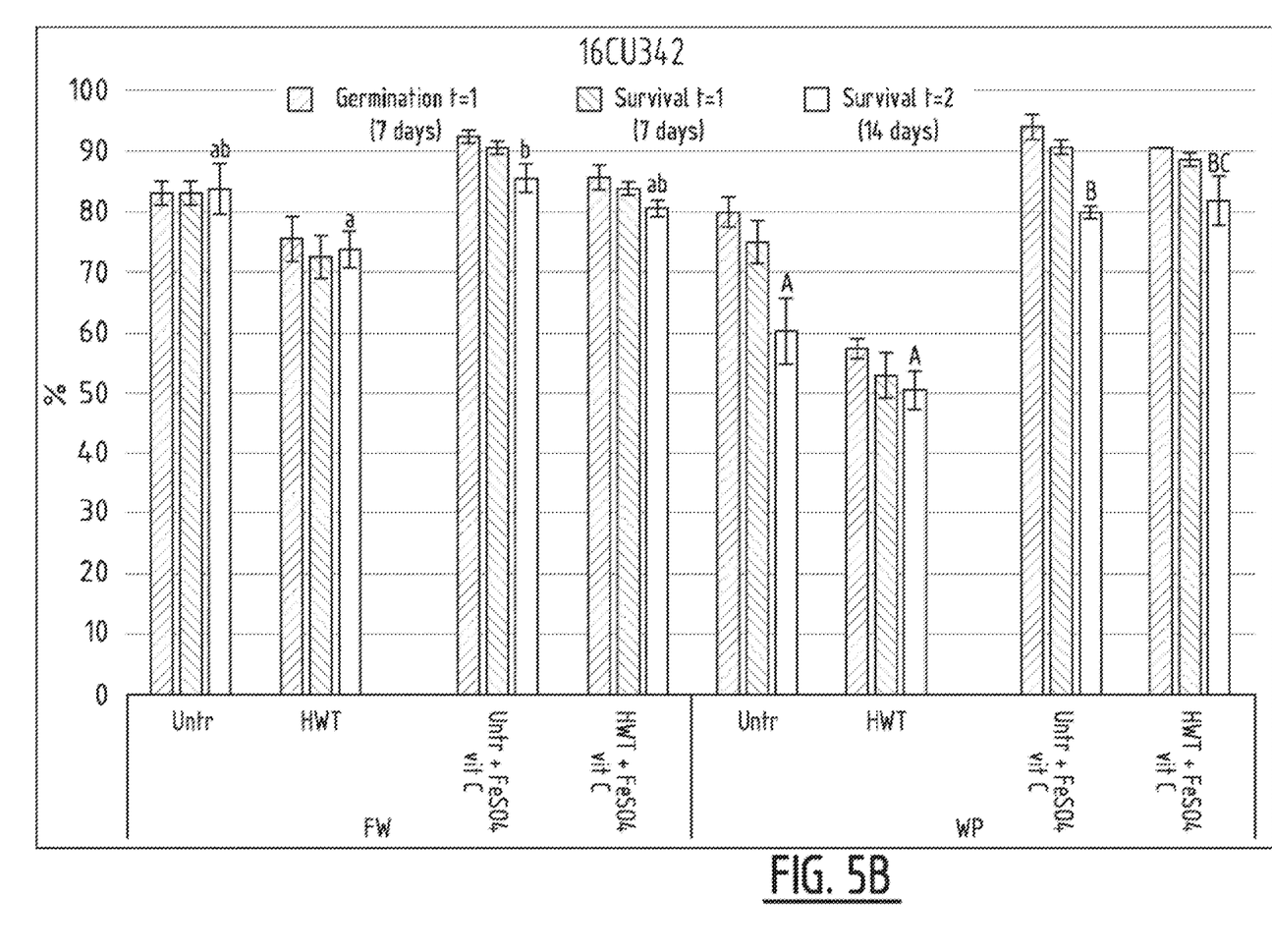
FIG. 5B is a graph showing the effect of hot water treatment of seeds of the varieties Finwhale (FW) and Woodpecker (WP), and subsequent treatment with 500 μg/seed of Fe(II)SO4, with vitamin C. The effect is expressed in the percentage of seedlings that have germinated as determined 7 days after sowing, the percentage of seedlings that are still alive and healthy 7 days after sowing, the percentage of plants that are still alive and healthy 14 days after sowing, in soil infected with *Phytium splendens* 16CU342. Bars are means of 3 replicates ±SEM. Different letters indicate significant differences according to Tukey's post-hoc test (P<0.05), performed separately for each seed variety at 14 days.

The results are shown in FIGS. 5A and 5B. These results indicate that the coating with Fe(II)SO$_4$ and vitamin C can also protect crops other than spinach against damping-off caused by *Pythium*.

Example 7: The Effect of the Iron Salt Solution on the Germination of Beetroot Seed in a Field with Damping-Off Problems, and Survival of Seedlings Grown Therefrom Seed of the beetroot variety Zeppo was coated with 500 μg/Fe(II)SO$_4$ per seed as described in Example 1, except that no vitamin C was added. The seed was sown in a field known to suffer from damping-off. The number of healthy seedlings was determined 14 days and 21 days after sowing.

Figure 6:
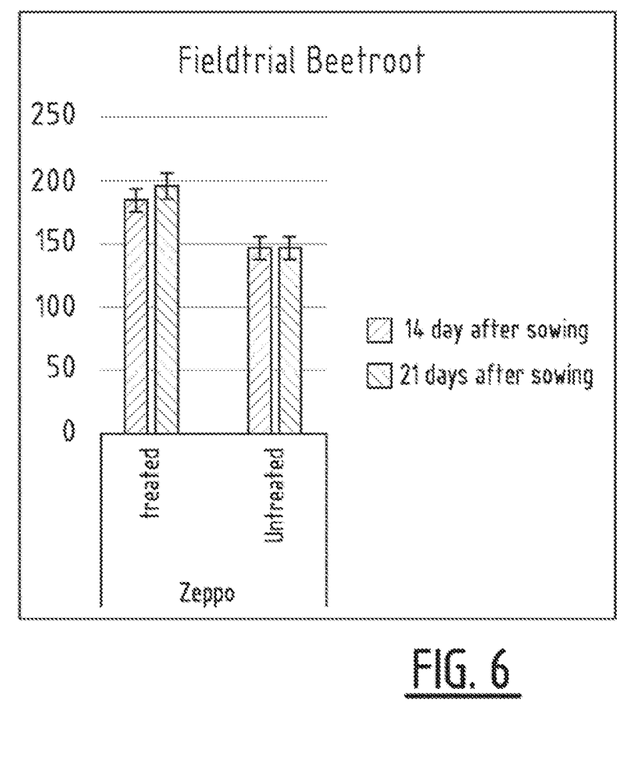
FIG. 6 is a graph showing the effect of treatment of seeds of the beetroot variety Zeppo with 500 μg/seed of Fe(II)SO4. The effect is expressed in the number of seedlings that are still alive and healthy 14 and 21 days after sowing.

The results are shown in FIG. 6. These results indicate that the coating with Fe(II)SO$_4$ also protects beetroot against damping-off.

Example 8: The Effect of the Iron Salt Solution on the Germination of Cornsalad Seed in Soil from a Field with Damping-Off Problems, and Survival of Seedlings Grown Therefrom Cornsalad seed was coated with 500 μg/Fe(II)SO$_4$ per seed as described in Example 1, except that no vitamin C was added. The seed was sown in soil from a field known to suffer from damping-off. The percentage of healthy seedlings was determined 7, 11, 17 and 24 days after sowing.

Figure 7A:
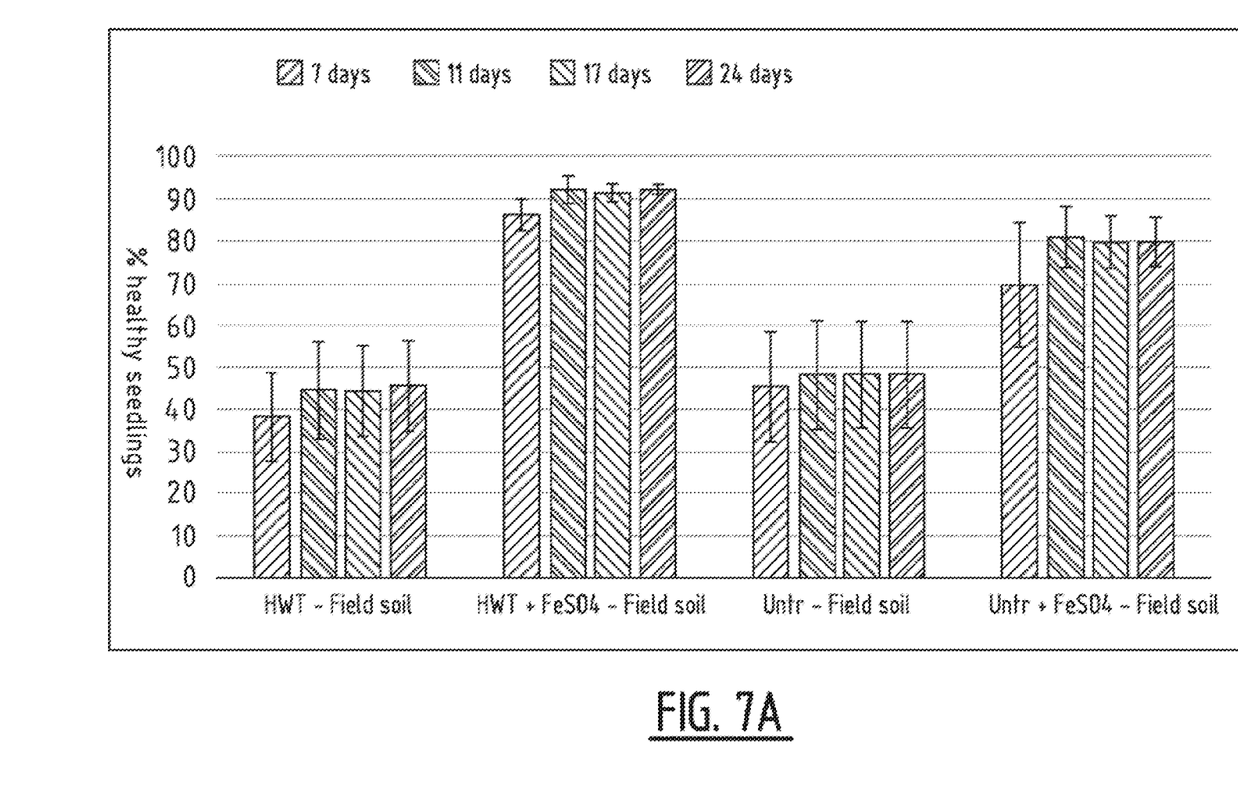
FIG. 7A is a graph showing the effect of hot water treatment of cornsalad seeds, and subsequent treatment with 500 μg/seed of Fe(II)SO4. The effect is expressed in the percentage of seedlings that are still alive and healthy 7, 11, 17 and 24 days after sowing in soil known to suffer from damping-off.

The results are shown in FIG. 7A.

Figure 7B:
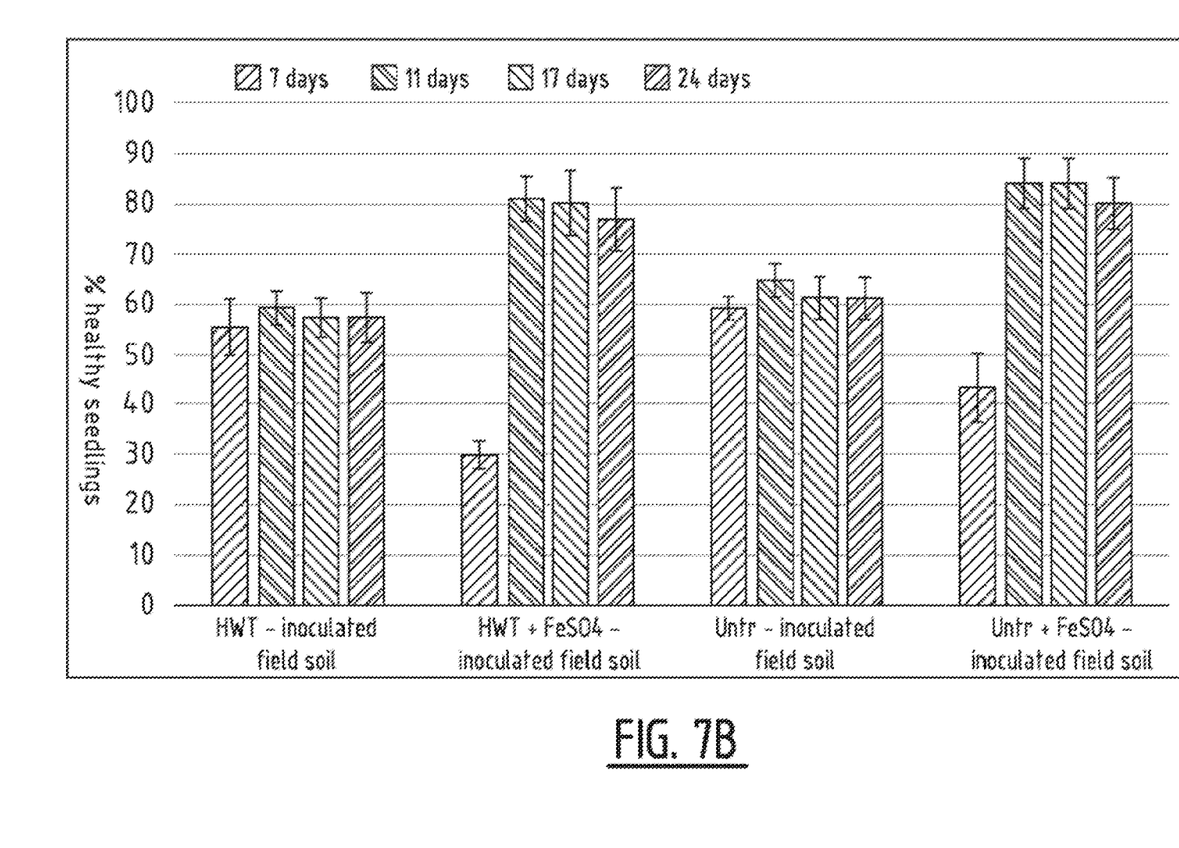
FIG. 7B is a graph showing the effect of hot water treatment of cornsalad seeds, and subsequent treatment with 500 μg/seed of Fe(II)SO4. The effect is expressed in the percentage of seedlings that are still alive and healthy 7, 11, 17 and 24 days after sowing in soil inoculated with *P. irregulare*.

The experiment was also performed on the cornsalad seed when sown in soil inoculated with *P. irregulare*, prepared as described in Example 2. The percentage of healthy seedlings was determined 7, 11, 17 and 24 days after sowing. The results are shown in FIG. 7B.

These results indicate that the coating with Fe(II)SO4 also protects cornsalad against damping-off.

Example 9: Determination of the Lowest Effective Concentration of Iron Salt

The experiment of Example 2 was repeated with the following modifications:

in addition to spinach seed of the variety Mandril, also seed of the varietie Finwhale is used; and the concentrations of Fe(II)SO$_4$ in the coating solution are: 50 μg Fe(II)SO$_4$ per seed, 100 μg Fe(II)SO$_4$ per seed, 150 μg Fe(II)SO$_4$ per seed, 200 μg Fe(II)SO$_4$ per seed, and 250 μg Fe(II)SO$_4$ per seed.

Figure 8:
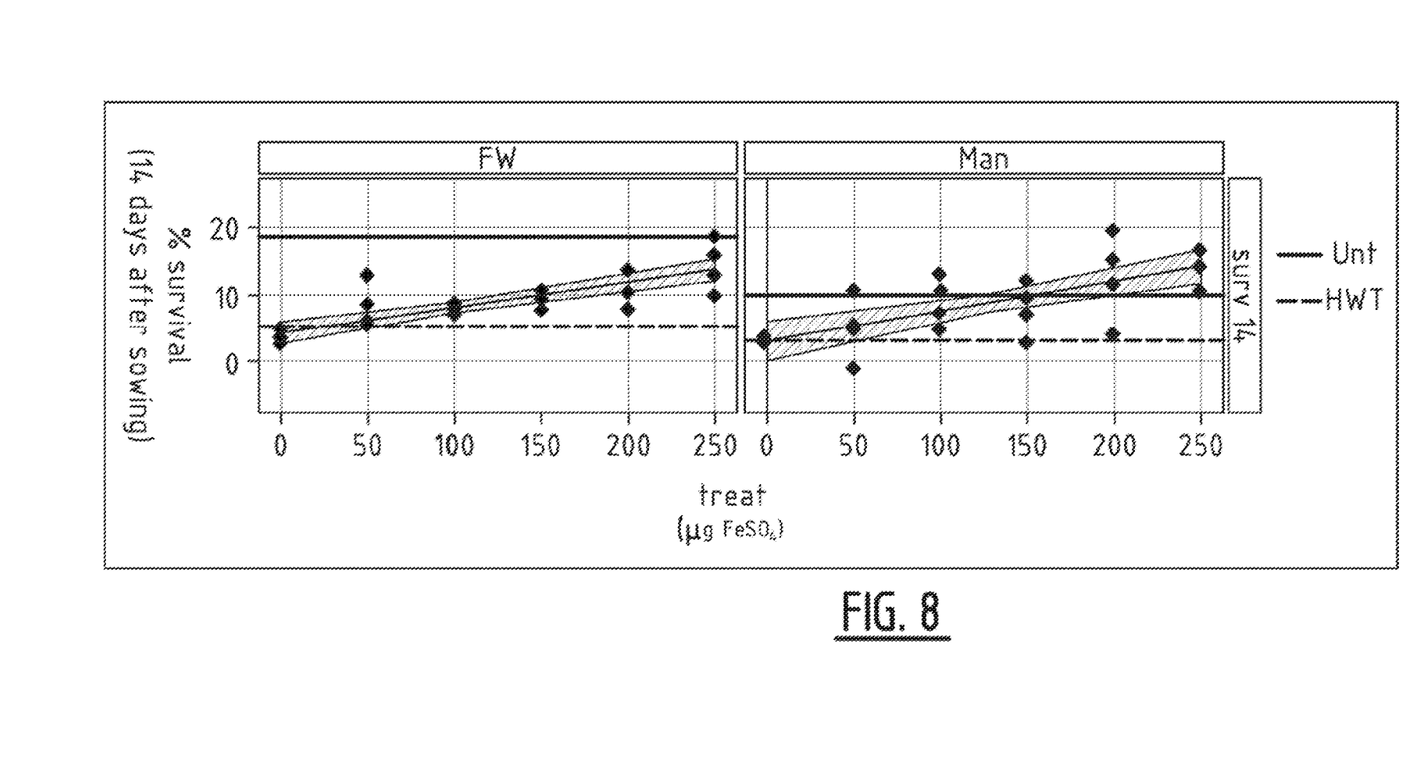
FIG. 8 is a graph showing the effect of hot water treatment of seeds of the varieties Finwhale and Mandril, and subsequent treatment with 50 μg/seed, 100 μg/seed, 150 μg/seed, 200 μg/seed, and 250 μg/seed of Fe(II)SO4. The effect is expressed in the percentage of seedlings that are still alive and healthy 14 days after sowing.

The results are shown in FIG. 8. These results show that there is a linear dose-effect response. Doses as low as 50 μg Fe(II)SO$_4$ can be effective to increase the germination and survival of hot-water treated seed, however, the minimum dose to achieve the same level of germination and survival as untreated seeds depends on the seed variety and/or batch of seed.

The invention is further described by the following numbered paragraphs:

1. Method for preventing damping-off from occurring on plant seed and/or seedlings, comprising contacting plant seed with a solution comprising iron salt.

2. Method of paragraph 1, wherein the iron salt is selected from the group consisting of iron(II)bromide, iron(II)chloride, iron(II)sulfate, iron(II)ammonium sulfate, iron(III)bromide, iron(III)chloride, iron(III)sulfate, iron(III)ammonium sulfate and ascorbate.

3. Method of paragraph 1 or 2, wherein the solution comprises at least 50 μg, and preferably at least 100 μg, 150 μg, 200 μg, 250 μg, or 500 μg iron salt per seed to be treated.

4. Method of any one of the paragraphs 1-3, wherein the solution comprises 250-500 iron salt per seed to be treated.

5. Method of any one of the paragraphs 1-4, wherein the plant seed is further contacted with vitamin C.

6. Method of paragraph 5, wherein the plant seed is contacted with at least 25 μg, and preferably at least 50 μg, 75 μg, 100 μg, 125 μg, 150 μg, or 175 μg vitamin C per seed to be treated.

7. Method of paragraph 5 or 6, wherein vitamin C is part of the solution comprising the iron salt.

8. Method of any one of the paragraphs 1-7, wherein the solution comprises 175-350 vitamin C per seed to be treated.

9. Method of any one of the paragraphs 1-8, wherein the treated seeds are subsequently dried.

10. Method of any one of the paragraphs 1-9, wherein the plant seed is selected from the group consisting of seeds from plants belonging to the following genera: *Spinacia, Lactuca, Solanum, Daucus, Cucumis, Cucurbita, Eruca, Brassica, Raphanus, Apium, Cichorium, Phaseolus, Beta, Valerianella, Diplotaxis, Allium, Asparagus, Foeniculum, Citrullus* and *Fragraria*.

11. Method of any one of the paragraphs 1-10, wherein prior to the method, the seed is subjected to a hot water treatment.

12. Plant seed coated with iron salt and optionally vitamin C.

13. Plant seed of paragraph 12, wherein the plant seed is selected from the group consisting of seeds from plants belonging to the following genera: *Spinacia, Lactuca, Solanum, Daucus, Cucumis, Cucurbita, Eruca, Brassica, Raphanus, Apium, Cichorium, Phaseolus, Beta, Valerianella, Diplotaxis, Allium, Asparagus, Foeniculum, Citrullus* and *Fragraria*.

14. Use of iron salt, and optionally vitamin C, for preventing damping-off from occurring on plant seed and/or seedlings.

15. Use of paragraph 14, wherein the plant seed is selected from the group consisting ofseeds from plants belonging to the following genera: *Spinacia, Lactuca, Solanum, Daucus, Cucumis, Cucurbita, Eruca, Brassica, Raphanus, Apium, Cichorium, Phaseolus, Beta, Valerianella, Diplotaxis, Allium, Asparagus, Foeniculum, Citrullus* and *Fragraria*.

16. Method for coating plant seed, comprising contacting plant seed with a solution comprising iron salt, wherein the coating with the iron salt on the seed protects the seed and/or the seedling growing therefrom against damping-off.

17. Method of paragraph 16, wherein the iron salt is selected from the group consisting of iron(II)bromide, iron(II)chloride, iron(II)sulfate, iron(II)ammonium sulfate, iron(III)bromide, iron(III)chloride, iron(III)sulfate, iron(III)ammonium sulfate and ascorbate.

18. Method of paragraph 16, wherein the solution comprises at least 50 and preferably at least 100 µg, 150 µg, 200 µg, 250 µg, or 500 µg iron salt per seed to be treated.

19. Method of any one of paragraphs 16-18, wherein the solution comprises 250-500 µg iron salt per seed to be treated.

20. Method of any one of paragraphs 16-19, wherein the plant seed is further contacted with vitamin C.

21. Method of paragraph 20, wherein the plant seed is contacted with at least 25 µg, and preferably at least 50 µg, 75 µg, 100 µg, 125 µg, 150 µg, or 175 µg vitamin C per seed to be treated.

22. Method of paragraph 20 or 21, wherein vitamin C is part of the solution comprising the iron salt.

23. Method of any one of paragraphs 16-22, wherein the solution comprises 175-350 µg vitamin C per seed to be treated.

24. Method of any one of paragraphs 16-23, wherein the treated seeds are subsequently dried.

25. Method of any one of paragraphs 16-24, wherein the plant seed is selected from the group consisting of seeds from plants belonging to the following genera: *Spinacia, Lactuca, Solanum, Daucus, Cucumis, Cucurbita, Eruca, Brassica, Raphanus, Apium, Cichorium, Phaseolus, Beta, Valerianella, Diplotaxis, Allium, Asparagus, Foeniculum, Citrullus* and *Fragraria*.

26. Method of any one of paragraphs 16-25, wherein prior to the method, the seed is subjected to a hot water treatment.

27. Plant seed coated with iron salt and optionally vitamin C, wherein the iron salt protects the seed and/or the seedling growing therefrom against damping-off.

28. Plant seed of paragraph 27, wherein the plant seed is selected from the group consisting of seeds from plants belonging to the following genera: *Spinacia, Lactuca, Solanum, Daucus, Cucumis, Cucurbita, Eruca, Brassica, Raphanus, Apium, Cichorium, Phaseolus, Beta, Valerianella, Diplotaxis, Allium, Asparagus, Foeniculum, Citrullus* and *Fragraria*.

29. Use of iron salt, and optionally vitamin C, for preventing damping-off from occurring on plant seed and/or seedlings by treating seeds with an iron salt, wherein the iron salt on the seed protects the seed and/or the seedling growing therefrom against damping off.

30. Use of paragraph 29, wherein the plant seed is selected from the group consisting of seeds from plants belonging to the following genera: *Spinacia, Lactuca, Solanum, Daucus, Cucumis, Cucurbita, Eruca, Brassica, Raphanus, Apium, Cichorium, Phaseolus, Beta, Valerianella, Diplotaxis, Allium, Asparagus, Foeniculum, Citrullus* and *Fragraria*.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A method for coating plant seed with a protectant against damping off consisting essentially of an iron salt and vitamin C, said method comprising
   (a) contacting the plant seed with a solution,
      wherein prior to the contacting, the plant seed is untreated against damping off, except as to optional hot water treatment, and
      the solution consists essentially of at least 50 µg iron salt per seed to be treated and 175-350 µg of vitamin C per seed to be treated,
      wherein the iron salt and vitamin C solution is absorbed by the plant seed,
   (b) drying the contacted plant seed of step (a) or allowing the contacted plant seed of step (a) to dry,
      wherein the dried contacted plant seed of step (b) has a moisture content as a percentage of the total weight of the seed of lower than 30%,
      whereby the plant seed is coated with the protectant against damping off consisting essentially of an iron salt and vitamin C, and
      wherein the plant seed is a seed from a plant belonging to Spinacia, Lactuca, Solanum, Daucus, Cucumis, Cucurbita, Eruca, Brassica, Raphanus, Apium, Cichorium, Phaseolus, Beta, Valerianella, Diplotaxis, Allium, Asparagus, Foeniculum, Citrullus or Fragraria.

2. The method as claimed in claim 1, wherein the iron salt is selected from the group consisting of iron(II)bromide, iron(II)chloride, iron(II)sulfate, iron(II)ammonium sulfate, iron(III)bromide, iron(III)chloride, iron(III)sulfate, iron(III)ammonium sulfate and ascorbate.

3. The method as claimed in claim 1, wherein the dried contacted plant seed of step (b) has a moisture content as a percentage of the total weight of the seed of lower than 15%.

4. The method as claimed in claim 1, wherein the solution consists essentially of at least 100 µg of iron salt per seed to be treated.

5. The method as claimed in claim 1, wherein the solution consists essentially of 250-500 µg of iron salt per seed to be treated.

6. The method as claimed claim 1, wherein the method further comprises, prior to the contacting step (a), subjecting the seed to a hot water treatment.

7. A method for preventing damping-off from occurring on plant seed and/or seedlings therefrom, said method comprising the coating plant seed with a protectant against damping off consisting essentially of an iron salt and vitamin C, said method comprising
   (a) contacting the plant seed with a solution,
      wherein, prior to the contacting, the plant seed is untreated against damping off, except as to optional hot water treatment, and
      the solution consists essentially of at least 50 µg iron salt per seed to be treated and 175-350 µg of vitamin C,
      wherein the iron salt and vitamin C solution is absorbed by the plant seed,
   (b) drying the contacted plant seed of step (a) or allowing the contacted plant seed of step (a) to dry,
      wherein the dried contacted plant seed of step (b) has a moisture content as a percentage of the total weight of the seed of lower than 30%,
      whereby the plant seed is coated with the protectant against damping off consisting essentially of an iron salt and vitamin C and damping-off is prevented, and wherein the plant seed is a seed from a plant belonging to Spinacia, Lactuca, Solanum, Daucus, Cucumis, Cucurbita, Eruca, Brassica, Raphanus, Apium, Cichorium, Phaseolus, Beta, Valerianella, Diplotaxis, Allium, Asparagus, Foeniculum, Citrullus or Fragraria.

8. A method for coating plant seed with a protectant against damping off consisting essentially of an iron salt and vitamin C, said method comprising (a) contacting plant seed with a solution,
wherein, prior to the contacting, the plant seed is untreated against damping off, except as to optional hot water treatment, and
the solution consists essentially of 250-500 μg iron salt per seed and 175-350 μg of vitamin C per seed to be treated,
wherein the iron salt and vitamin C solution is absorbed by the plant seed, (b) drying the contacted plant seed of step (a) or allowing the contacted plant seed of step (a) to dry,
wherein the dried contacted plant seed of step (a) has a moisture content as a percentage of the total weight of the seed of lower than 15%,
whereby the plant seed is coated with the protectant against damping off consisting essentially of an iron salt and vitamin C, and
wherein the plant seed is a seed from a plant belonging to Spinacia, Lactuca, Solanum, Daucus, Cucumis, Cucurbita, Eruca, Brassica, Raphanus, Apium, Cichorium, Phaseolus, Beta, Valerianella, Diplotaxis, Allium, Asparagus, Foeniculum, Citrullus or Fragraria.

* * * * *